(12) United States Patent
Park et al.

(10) Patent No.: US 10,177,827 B2
(45) Date of Patent: Jan. 8, 2019

(54) BASE STATION, MOBILE STATION AND METHOD THEREOF

(71) Applicant: Huawei Technologies Co., Ltd., Shenzhen (CN)

(72) Inventors: JaeHyun Park, Shenzhen (CN); Bruno Clerckx, Shenzhen (CN); Kunpeng Liu, Shenzhen (CN)

(73) Assignee: Huawei Technologies Co., Ltd, Shenzhen (CN)

(*) Notice: Subject to any disclaimer, the term of this patent is extended or adjusted under 35 U.S.C. 154(b) by 176 days.

(21) Appl. No.: 15/235,952

(22) Filed: Aug. 12, 2016

(65) Prior Publication Data

US 2016/0352402 A1    Dec. 1, 2016

Related U.S. Application Data

(63) Continuation of application No. PCT/CN2014/072089, filed on Feb. 14, 2014.

(51) Int. Cl.
*H04B 7/06* (2006.01)
*H04B 7/10* (2017.01)
(Continued)

(52) U.S. Cl.
CPC .......... *H04B 7/065* (2013.01); *H04B 7/0413* (2013.01); *H04B 7/0452* (2013.01);
(Continued)

(58) Field of Classification Search
CPC ............. H04B 7/06; H04B 7/04; H04B 72/12
See application file for complete search history.

(56) References Cited

U.S. PATENT DOCUMENTS

| 7,764,746 B2 | 7/2010 | Clerckx et al. |
| 2008/0186212 A1* | 8/2008 | Clerckx ............... H04B 7/0456 341/55 |

(Continued)

FOREIGN PATENT DOCUMENTS

| CN | 101179313 A | 5/2008 |
| CN | 101459457 A | 6/2009 |

(Continued)

OTHER PUBLICATIONS

Adhikary, A., et al., "Joint Spatial Division and Multiplexing—The Large-Scale Array Regime," IEEE Transactions on Information Theory, vol. 59, No. 10, Oct. 2013, pp. 6441-6463.

*Primary Examiner* — Kamran Afshar
*Assistant Examiner* — Farideh Madani
(74) *Attorney, Agent, or Firm* — Slater Matsil, LLP (57) ABSTRACT

The embodiment of the disclosure discloses a base station, a mobile station and a method thereof. The base station includes a processor and a transceiver. The processor determines a first subgroup to which a first mobile station belongs, wherein the first mobile station is one of a plurality of mobile stations, the plurality of mobile stations are grouped into G groups based on spatial correlation, the mobile stations in each of the G groups are further grouped into S subgroups based on polarization, the mobile stations in a same subgroup have a same polarization and the mobile stations in different subgroups have different polarizations. The transceiver communicates with the first mobile station according to the polarization of the first subgroup. The embodiments of the disclosure utilize polarization jointly with the spatial correlation in dual structured procoding so that feedback overhead can be reduced.

18 Claims, 5 Drawing Sheets

(51) Int. Cl.
  H04B 7/0452 (2017.01)
  H04B 7/0456 (2017.01)
  H04B 7/0413 (2017.01)
  H04L 5/00 (2006.01)
  *H04W 88/02* (2009.01)
  *H04W 88/08* (2009.01)

(52) U.S. Cl.
  CPC ......... H04B 7/0469 (2013.01); H04B 7/0478 (2013.01); H04B 7/0626 (2013.01); H04B 7/10 (2013.01); H04L 5/005 (2013.01); *H04W 88/02* (2013.01); *H04W 88/08* (2013.01)

(56) References Cited

U.S. PATENT DOCUMENTS

| | | | |
|---|---|---|---|
| 2011/0150052 A1 | 6/2011 | Erell et al. | |
| 2012/0236814 A1* | 9/2012 | Nishio | H04L 5/001 370/329 |
| 2013/0084908 A1* | 4/2013 | Joo | H04W 72/046 455/509 |
| 2015/0016379 A1* | 1/2015 | Nam | H04B 7/0456 370/329 |
| 2015/0207549 A1 | 7/2015 | Nagata et al. | |

FOREIGN PATENT DOCUMENTS

| | | | | |
|---|---|---|---|---|
| CN | 101577610 A | 11/2009 | | |
| EP | 2031768 A1 * | 3/2009 | ............... | H04B 7/10 |
| WO | 2011050756 A1 | 5/2011 | | |
| WO | 2011124012 A1 | 10/2011 | | |
| WO | 2011137752 A1 | 11/2011 | | |
| WO | WO 2012093332 A1 * | 7/2012 | ........... | H04B 7/0478 |
| WO | 2012151143 A1 | 11/2012 | | |
| WO | 2013107135 A1 | 7/2013 | | |
| WO | 2013125917 A1 | 8/2013 | | |
| WO | 2014021008 A1 | 2/2014 | | |

* cited by examiner

BASE STATION, MOBILE STATION AND METHOD THEREOF

CROSS-REFERENCE TO RELATED APPLICATIONS

This application is a continuation of International Application No. PCT/CN2014/072089, filed on Feb. 14, 2014, which application is hereby incorporated herein by reference.

TECHNICAL FIELD

The disclosure relates to the technical field of the mobile communication, and in particular to a base station, a mobile station and a method thereof.

BACKGROUND

By exploiting multiple antennas at BS (Base Station) or eNodeB, the system throughput can be drastically improved by supporting multiple MSs (Mobile Station) simultaneously. However, the acquisition of the CSIT (Channel State Information at Transmitter) in the base station is critical to achieve the optimal system throughput, but is challenging because CSI (Channel State Information) should be obtained through either the feedback from MSs (in case of FDD and TDD) or the delicate calibration process (in case of TDD). In both FDD and TDD, the feedback of CSI from MSs is necessary and its overhead increases as the number of antennas at the BS increases.

As related arts, to reduce the feedback overhead, several dual structured feedback and the associated precoding schemes have been developed. In the dual structured feedback, the feedback information is composed of two parts— long-term CSIT (mainly, spatial correlation) and short-term CSIT. Accordingly, precoding procedure has two concatenated parts based on long-term CSIT and short-term CSIT.

However, as the number of antennas increases at BS, the feedback overhead becomes more critical problem and the related arts do not consider the case that the BS has an extremely large number of antennas such as Massive MIMO (Multi-Input Multi-Output).

SUMMARY

The embodiment of the disclosure relates to a base station, a mobile station and a method thereof to reduce the feedback overhead.

In a first aspect, there is provided a base station. The base station includes a processor configured to determine a first subgroup to which a first mobile station belongs, wherein the first mobile station is one of a plurality of mobile stations, the plurality of mobile stations are grouped into G groups based on spatial correlation, the mobile stations in each of the G groups are further grouped into S subgroups based on polarization, the mobile stations in a same subgroup have a same polarization and the mobile stations in different subgroups have different polarizations, G and S being positive integers. The base station also includes a transceiver configured to communicate with the first mobile station according to the polarization of the first subgroup.

In a first possible implementation form of the base station according to the first aspect as such, the transceiver comprises a precoder configured to precode a data stream using a precoding matrix corresponding to the polarization of the first subgroup; and a transmitter configured to transmitting the precoded data stream to the first mobile station.

In a second possible implementation form of the base station according to the first aspect as such or according to the any of the preceding implementation forms of the first aspect, the precoding matrix corresponding to the polarization of the first subgroup is designed as a dual structured matrix where the first subgroup is the p-th subgroup in the g-th group, $B_{gp}$ is a preprocessing matrix determined based on a long-term channel estimation for the first subgroup, and $P_{gp}$ is matrix specific to the first mobile station.

In a third possible implementation form of the base station according to the first aspect as such or according to the any of the preceding implementation forms of the first aspect, $$P_{gp} = \varsigma_{gp} \hat{K}_{gp} \hat{H}_{gp}, \ \hat{K}_{gp} = \left( \hat{H}_{gp} \hat{H}_{gp}^H + \overline{B}/2\alpha I_{\overline{B}/2} \right)^{-1},$$

$$\varsigma_{gp}^2 = \frac{\overline{N}/2}{\|B_{gp} P_{gp}\|_F^2}$$

where $H_{gp}$ is a channel matrix for the first subgroup, $\overline{B}$ is a design parameter that determines dimension of transformed channel based on long-term channel estimation, $\alpha$ is a regularization factor, and $\overline{N}/2$ is the number of mobile stations in the first subgroup.

In a fourth possible implementation form of the base station according to the first aspect as such or according to the any of the preceding implementation forms of the first aspect, the processor is further configured to determine a first group to which the first mobile station belongs, wherein the first group is one of the G groups; and the transceiver is further configured to communicate with the first mobile station according to the spatial correlation of the first group.

In a fifth possible implementation form of the base station according to the first aspect as such or according to the any of the preceding implementation forms of the first aspect, the base station further comprises a switcher configured to determine whether a first communicating mode or a second communicating mode is applied by the transceiver, wherein in the first communicating mode the transceiver communicates with the first mobile station according to the spatial correlation of the first group and in the second communicating mode the transceiver communicates with the first mobile station according to the polarization of the first subgroup.

In a sixth possible implementation form of the base station according to the first aspect as such or according to the any of the preceding implementation forms of the first aspect, the switcher determines, based on an inverse of cross polar discrimination XPD and/or number of feedback bits, whether the first communicating mode or the second communicating mode is applied.

In a seventh possible implementation form of the base station according to the first aspect as such or according to the any of the preceding implementation forms of the first aspect, the transceiver comprises: a transmitter configured to send a first CSI-RS to the first mobile station, enabling the first mobile station to obtain a long-term channel estimation based on the first CSI-RS; and a receiver configured to receive the long-term channel estimation from the first mobile station, the long-term channel estimation comprising $R_g^s$ and $\chi$ where $R_g^s$ is spatial correlation matrix for the g-th group and $\chi$ is the inverse of XPD.

In a eighth possible implementation form of the base station according to the first aspect as such or according to the any of the preceding implementation forms of the first aspect, the transmitter is further configured to send a second CSI-RS to the first mobile station, informing the first mobile station of the determined communicating mode and enabling the first mobile station to obtain a group-polarization specific CSI from based on the second CSI-RS; and the receiver is further configured to receive, from the first mobile station, the group-polarization specific CSI which is used to obtain a user specific precoding matrix.

In a ninth possible implementation form of the base station according to the first aspect as such or according to the any of the preceding implementation forms of the first aspect, the transceiver is configured to communicate with the first mobile station using a codebook corresponding to the polarization of the first subgroup, wherein in the codebook the element indicating another polarization than the polarization of the first subgroup has a value of 0.

In a second aspect, there is provided a mobile station. The mobile station includes a receiver configured to receive, from a base station, a first data stream, wherein the first data stream is precoded by the base station using a precoding matrix corresponding to a polarization of a first subgroup, the mobile station belongs to the first subgroup, the mobile station is one of a plurality of mobile stations, the plurality of mobile stations are grouped into G groups based on spatial correlation, the mobile stations in each of the G groups are further grouped into S subgroups based on polarization, the mobile stations in a same subgroup have a same polarization and the mobile stations in different subgroups have different polarizations, G and S being positive integers. The mobile station also includes a decoder configured to decode the first data stream according to the polarization of the first subgroup.

In a first possible implementation form of the mobile station according to the second aspect as such, the receiver is further configured to receive, from the base station, a second data stream, wherein the second data stream is precoded by the base station using a precoding matrix corresponding to a spatial correlation of a first group, the mobile station belongs to the first group, and the first group is one of the G groups; and the decoder is further configured to decode the second data stream according to the spatial correlation of the first group.

In a second possible implementation form of the mobile station according to the second aspect as such or according to the any of the preceding implementation forms of the second aspect, the mobile station further comprises a transmitter, wherein the receiver is further configured to receive a first CSI-RS from the base station. The transmitter is configured to send, to the base station, a long-term channel estimation obtained based on the first CSI-RS, the long-term channel estimation comprising $R_g^s$ and $\chi$ where $R_g^s$ is spatial correlation matrix for the g-th group and $\chi$ is the inverse of cross polar discrimination XPD.

In a third possible implementation form of the mobile station according to the second aspect as such or according to the any of the preceding implementation forms of the second aspect, the receiver is further configured receive, from the base station, a second CSI-RS informing of a communicating mode determined by the base station wherein if the communicating mode is a first communicating mode the base station precodes the first data stream according to the spatial correlation of the first group and if the communicating mode is a second communicating mode the base station precodes the second data stream according to the polarization of the first subgroup; and the transmitter is further configured to send, to the base station, a group-polarization specific CSI obtained based on the second CSI-RS enabling the base station to obtain a user specific precoding matrix based on the group-polarization specific CSI.

In a fourth possible implementation form of the mobile station according to the second aspect as such or according to the any of the preceding implementation forms of the second aspect, the receiver and the transmitter are further configured to use, according to the communicating mode informed by the second CSI-RS, a codebook corresponding to the polarization of the first subgroup or a codebook corresponding to the spatial correlation of the first group, wherein in the codebook corresponding to the polarization of the first subgroup the element indicating another polarization than the polarization of the first subgroup has a value of 0.

In a third aspect, there is provided a method for mobile communication. The method includes: determining, by a base station, a first subgroup to which a first mobile station belongs, wherein the first mobile station is one of a plurality of mobile stations, the plurality of mobile stations are grouped into G groups based on spatial correlation, the mobile stations in each of the G groups are further grouped into S subgroups based on polarization, the mobile stations in a same subgroup have a same polarization and the mobile stations in different subgroups have different polarizations, G and S being positive integers; and communicating, by the base station, with the first mobile station according to the polarization of the first subgroup.

In a first possible implementation form of the method according to the third aspect as such or according to the any of the preceding implementation forms of the third aspect, communicating, by the base station, with the first mobile station according to the polarization of the first subgroup, comprises precoding a data stream using a precoding matrix corresponding to the polarization of the first subgroup; and transmitting the precoded data stream to the first mobile station.

In a second possible implementation form of the method according to the third aspect as such or according to the any of the preceding implementation forms of the third aspect, the precoding matrix corresponding to the polarization of the first subgroup is designed as a dual structured matrix $$B_{gp}P_{gp}$$

where the first subgroup is the p-th subgroup in the g-th group, $B_{gp}$ is a preprocessing matrix determined based on a long-term channel estimation for the first subgroup, and $P_{gp}$ is matrix specific to the first mobile station.

In a third possible implementation form of the method according to the third aspect as such or according to the any of the preceding implementation forms of the third aspect, $$P_{gp} = \bar{\varsigma}_{gp}\hat{K}_{gp}\hat{H}_{gp}, \ \hat{K}_{gp} = \left(\hat{H}_{gp}\hat{H}_{gp}^H + \bar{B}/2\alpha I_{B/2}\right)^{-1},$$

$$\bar{\varsigma}_{gp}^2 = \frac{\bar{N}/2}{\|B_{gp}P_{gp}\|_F^2}$$

where $H_{gp}$ is a channel matrix for the first subgroup, $\bar{B}$ is a design parameter that determines dimension of transformed channel based on long-term channel estimation, $\alpha$ is a regularization factor, and $\bar{N}/2$ is the number of mobile stations in the first subgroup.

In a fourth possible implementation form of the method according to the third aspect as such or according to the any of the preceding implementation forms of the third aspect, the method further comprises determining, by the base station, a first group to which the first mobile station belongs, wherein the first group is one of the G groups; and communicating, by the base station, with the first mobile station according to the spatial correlation of the first group.

In a fifth possible implementation form of the method according to the third aspect as such or according to the any of the preceding implementation forms of the third aspect, before communicating with the first mobile station, the method further comprises determining, by the base station, whether a first communicating mode or a second communicating mode is applied, wherein in the first communicating mode the base station communicates with the first mobile station according to the spatial correlation of the first group and in the second communicating mode the base station communicates with the first mobile station according to the polarization of the first subgroup.

In a sixth possible implementation form of the method according to the third aspect as such or according to the any of the preceding implementation forms of the third aspect, determining, by the base station, whether a first communicating mode or a second communicating mode is applied comprises: determining, based on an inverse of cross polar discrimination XPD and/or number of feedback bits, whether the first communicating mode or the second communicating mode is applied.

In a seventh possible implementation form of the method according to the third aspect as such or according to the any of the preceding implementation forms of the third aspect, the method further comprises sending, by the base station, a first CSI-RS to the first mobile station, enabling the first mobile station to obtain a long-term channel estimation based on the first CSI-RS; and receiving, by the base station, the long-term channel estimation from the first mobile station, the long-term channel estimation comprising $R_g^s$ and $\chi$ where $R_g^s$ is spatial correlation matrix for the gth group and $\chi$ is the inverse of XPD.

In a eighth possible implementation form of the method according to the third aspect as such or according to the any of the preceding implementation forms of the third aspect, the method further comprises sending, by the base station, a second CSI-RS to the first mobile station, informing the first mobile station of the determined communicating mode and enabling the first mobile station to obtain a group-polarization specific CSI from based on the second CSI-RS; receiving, by the base station, the group-polarization specific CSI from the first mobile station; and obtaining, by the base station, a user specific precoding matrix according to the group-polarization specific CSI.

In a ninth possible implementation form of the method according to the third aspect as such or according to the any of the preceding implementation forms of the third aspect, communicating, by the base station, with the first mobile station according to the polarization of the first subgroup, comprises: communicating, by the base station, with the first mobile station using a codebook corresponding to the polarization of the first subgroup, wherein in the codebook the element indicating another polarization than the polarization of the first subgroup has a value of 0.

In a fourth aspect, there is provided a method for mobile communication, the method comprising receiving, by a mobile station from a base station, a first data stream, wherein the first data stream is precoded by the base station using a precoding matrix corresponding to a polarization of a first subgroup, the mobile station belongs to the first subgroup, the mobile station is one of a plurality of mobile stations, the plurality of mobile stations are grouped into G groups based on spatial correlation, the mobile stations in each of the G groups are further grouped into S subgroups based on polarization, the mobile stations in a same subgroup have a same polarization and the mobile stations in different subgroups have different polarizations, G and S being positive integers; and decoding, by the mobile station, the first data stream according to the polarization of the first subgroup.

In a first possible implementation form of the method according to the fourth aspect as such, the method further comprises receiving, by a mobile station from the base station, a second data stream, wherein the second data stream is precoded by the base station using a precoding matrix corresponding to a spatial correlation of a first group, the mobile station belongs to the first group, and the first group is one of the G groups; and decoding, by the mobile station, the second data stream according to the spatial correlation of the first group.

In a second possible implementation form of the method according to the fourth aspect as such or according to the any of the preceding implementation forms of the fourth aspect, the method further comprises receiving, by the mobile station, a first CSI-RS from the base station; obtaining, by the mobile station, a long-term channel estimation based on the first CSI-RS; and sending, by the mobile station to the base station, the long-term channel estimation, the long-term channel estimation comprising $R_g^s$ and $\chi$ where $R_g^s$ is spatial correlation matrix for the g-th group and $\chi$ is the inverse of cross polar discrimination XPD.

In a third possible implementation form of the method according to the fourth aspect as such or according to the any of the preceding implementation forms of the fourth aspect, the method further comprises receiving, by the mobile station from the base station, a second CSI-RS informing of a communicating mode determined by the base station wherein if the communicating mode is a first communicating mode the base station precodes the first data stream according to the spatial correlation of the first group and if the communicating mode is a second communicating mode the base station precodes the second data stream according to the polarization of the first subgroup; obtaining, by the mobile station, a group-polarization specific CSI based on the second CSI-RS and sending, by the mobile station to the base station, the group-polarization specific CSI enabling the base station to obtain a user specific precoding matrix based on the group-polarization specific CSI.

In a fourth possible implementation form of the method according to the fourth aspect as such or according to the any of the preceding implementation forms of the fourth aspect, the method further comprises communicating, by the mobile station, with the base station using a codebook corresponding to the polarization of the first subgroup, wherein in the codebook the element indicating another polarization than the polarization of the first subgroup has a value of 0.

Therefore the embodiments of the disclosure utilize polarization jointly with the spatial correlation in dual structured procoding so that feedback overhead can be reduced.

BRIEF DESCRIPTION OF THE DRAWINGS

In order to more clearly describe the embodiments of the disclosure, accompanying drawings necessary for describing the embodiments would be briefly described below. It is obvious to ordinary ones skilled in the art that these drawings described below are only for some embodiments of the disclosure and other drawings can be obtained from these drawings without any creative effort.

DETAILED DESCRIPTION OF ILLUSTRATIVE EMBODIMENTS

Hereinafter, the technical solutions in the embodiments of the disclosure would be clearly and fully described in connection with the accompanying drawings showing these embodiments. Obviously, the embodiments described are only a part of the embodiments of the disclosure, but not all the embodiments. Based on these embodiments, all other embodiments conceived by ordinary ones skilled in the art without any creative effort would fall within the protection scope of the disclosure.

Figure 1:
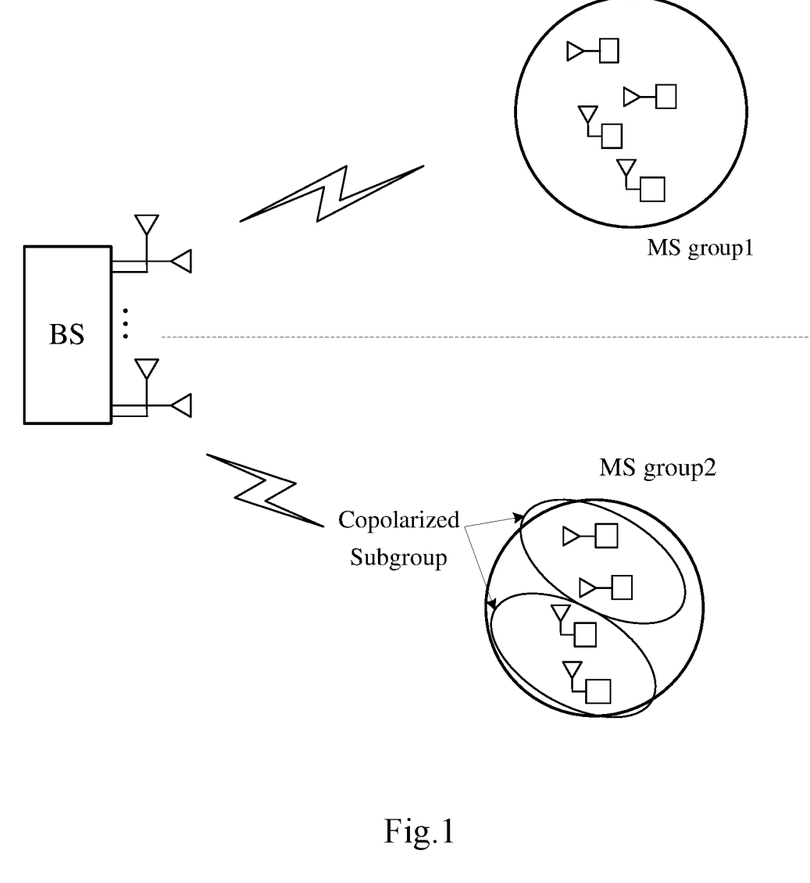
FIG. 1 shows an example of a dual polarized antenna array deployed at BS and a single polarized antenna deployed at MS.

The disclosure deals with the transmission strategies of BS or eNodeB with (possibly a large number of) multiple polarized antennas serving multiple MSs. FIG. 1 shows an example of a dual polarized antenna array deployed at BS and a single polarized antenna deployed at MS.

Specifically, FIG. 1 shows an example of 2-dimensional channel model. That is, the spatial correlation depends on the azimuth angles of multi-paths, not on their elevation angles. But this can be extended to the 3-dimensional channel model considering both azimuth and elevation angles. Here, the BS has M/2 pairs of co-located vertically/horizontally-polarized antenna elements. Since human activity is usually confined in small clustered regions such as buildings, locations of MSs tend to be clustered, e.g., G groups where G is any positive integer. Although FIG. 1 shows an exemplified system with two groups (G=2), MS group 1 and MS group 2, the embodiments of the disclosure can be applied to any number of groups.

According to polarizations of MSs, the MSs in one group may be further grouped into S subgroups where S is the number of polarization and is a positive integer. In the exemplified system, S=2, meaning two subgroups of MSs with vertically-polarized antenna elements and horizontally-polarized antenna elements, respectively. However, the value of S and the specific polarizations that can be applied in the disclosure should not be limited to the exemplified system.

Then, the received signal $y_g$ of the g-th group with an assumption of flat-fading channel is given by $$y_g = \begin{bmatrix} y_g^v \\ y_g^h \end{bmatrix} = H_g^H x + n_g \quad (1)$$

where $y_g^v$ and $y_g^h$ are the received signal for MSs with vertical and horizontal polarization, respectively, and $n_g$ is a zero-mean complex Gaussian noise vector. For simplicity, we have assumed that each group has $\bar{N}$ MSs ($\bar{N}/2$ vertically polarized and $\bar{N}/2$ horizontally polarized MSs), which can also be extended to an arbitrary number of MSs in each group. The channel between the BS and the k-th MS in the g-th group is then given as $h_{gk}=[H_g]_k$, where $[A]_k$ denotes the k-th column of A. The linearly precoded signal x can be written as $$x = \sum_{g=1}^{G} V_g d_g, \quad V_g \in \mathbb{C}^{M \times \bar{N}}, \quad (2)$$

where $V_g$ and $d_g$ are the linear precoding matrix and the data symbol vector for the MSs in the g-th group, respectively.

By using the Karhunen-Loeve transform and the polarized MIMO channel modeling with infinitesimally small antenna elements, the downlink channel to the gth group, $H_g$ can be represented as $$H_g = \left( \begin{bmatrix} 1 & r_{xp} \\ r_{xp} & 1 \end{bmatrix} \otimes (U_g \Lambda_g^{1/2}) \right) \left( G_g \odot \left( X \otimes 1_{r \times \frac{\bar{N}}{2}} \right) \right) \quad (3)$$

where $r_{xp}(\approx 0)$ is the correlation coefficient between vertically and horizontally polarized antennas, $\Lambda_g$ is an r×r diagonal matrix with the non-zero eigenvalues of the spatial correlation matrix $R_g^s$ for the gth group (generally, r<<M), and $$U_g \in \mathbb{C}^{\frac{M}{2} \times r}$$

has the associated eigenvectors of $R_g^s$ as columns. Here, the spatial correlation is the same for vertically polarized antenna arrays and horizontally polarized antenna arrays, but the extension to more general case is straightforward. The matrix $G_g$ is defined as:

$$G_g = \begin{bmatrix} G_g^{vv} & G_g^{hv} \\ G_g^{vh} & G_g^{hh} \end{bmatrix}, \quad (4)$$

with complex Gaussian distributed entries, and determines the short-term CSI. The matrix X describes the power imbalance between the orthogonal polarizations and is given as $$X = \begin{bmatrix} 1 & \sqrt{\chi_0} \\ \sqrt{\chi_0} & 1 \end{bmatrix} \quad (5)$$

where the parameter $0 \leq \chi_0 \leq 1$ is the inverse of the XPD (Cross Polar Discrimination). The covariance matrix of $H_g$ is then given as $$R_g = ((1+\chi_0)I_2 \otimes R_g^s). \quad (6)$$

A known scheme of dual structured precoding with grouping based on spatial correlation only will be described hereinafter. Note that the long term parameter $R_g^s$ and $\chi_0$ are slowly-varying and can be obtained with a low feedback overhead. Because of the advantages of the computational complexity reduction and the feedback overhead reduction (i.e., the dimension reduction using long-term statistics), the dual precoding scheme based on long-term/short-term CSIT has been utilized, in which the precoding matrix for the gth group is given as $$V_g = B_g P_g \quad (7)$$

where $B_g \in \mathbb{C}^{M \times \overline{B}}$ is the preprocessing matrix based on the long-term channel estimation with $\overline{N} \leq \overline{B} \leq 2r \ll M$ and $P_g$ is the precoding matrix for the effective (instantaneous) channel $H_g^H B_g$. Here, $\overline{B}$ is a design parameter that determines the dimension of the transformed channel based on the long-term CSIT. To null out the interferences from other groups, $B_g$ can be designed as $H_l^H B_g \approx 0$ for $l \neq g$. One example of computing $B_g$ is the block diagonalization (BD). That is, due to the block diagonal structure in eq. (6), $B_g$ can be given as $$B_g = I_2 \otimes B_g^s, \quad (8)$$

and we define $$U_{-g} = [U_1^a, \ldots, U_{g-1}^a, U_{g+1}^a, \ldots, U_G^a] \in \mathbb{C}^{\frac{M}{2} \times \sum_{l \neq g} r_l^a}, \quad (9)$$

where $U_g^a = [U_g]_{1:r_g^a}$ and $r_g^a$ is the number of dominant eigenvalues of $R_g^s$. Its null space has a dimension of $$\frac{M}{2} - \sum_{l \neq g} r_l^a.$$

The design parameter $\overline{B}$ should be chosen as $$\frac{\overline{N}}{2} \leq \frac{\overline{B}}{2} \leq \min\left(r_g, \frac{M}{2} - \sum_{l \neq g} r_l^a\right).$$

Therefore, once $B_g^s$ is designed such that it lies in the null space of $U_{-g}$, the condition of $H_l^H B_g \approx 0$ is satisfied. The received signal $y_g$ of the g th group in eq. (1) can be rewritten as $$y_g = H_g^H B_g P_g d_g + \sum_{l=1, l \neq g}^{G} H_g^H B_l P_l d_l + n_g \quad (10)$$

$$= H_g^H B_g P_g d_g + n_g$$

Here, the effective channel is $\overline{H}_g = B_g^H H_g$ and by using $\overline{H}_g$, the second precoding matrix $P_g$ can be computed as the regularized ZF:

$$P_{g,rzf} = \overline{\varsigma}_g \hat{\overline{K}}_g \hat{\overline{H}}_g, \quad (11)$$

$$\hat{\overline{K}}_g = \left(\hat{\overline{H}}_g \hat{\overline{H}}_g^H + \overline{B}\alpha I_{\overline{B}}\right)^{-1},$$

$$\overline{\varsigma}_g^2 = \frac{\overline{N}}{\|B_g P_{g,rzf}\|_F^2}.$$

The above known scheme is denoted as dual precoding with BD based on spatial correlation.

An exemplified scheme of dual structured precoding with grouping based on spatial correlation and subgrouping based on polarization will be described hereinafter according to an embodiment of the disclosure. In eq. (3), when $\chi_0$ becomes small (i.e., the antennas can favorably discriminate the orthogonally polarized signals), the interference signals through the cross-polarized channels can be naturally nulled out. In the disclosure, we make the subgroups of co-polarized MSs in each group and let the BS precode the signal for the co-polarized subgroup by using the short-term CSIT of transmit antennas having the same polarization with the associated subgroup. From eq. (1) and eq. (10), the received signal for the co-polarized subgroup with p polarization $p \in \{h,v\}$, the gth group can be written as $$y_g^p = \quad (12)$$

$$H_{gp}^H B_{gp} P_{gp} d_g^p + \sum_{\substack{q \in \{v,h\} \\ q \neq p}} H_{gp}^H B_{gq} P_{gq} d_g^q + \sum_{l=1, l \neq g}^{G} \sum_{q=\{h,v\}} H_{gp}^H B_{lq} P_{lq} d_l^q + n_g^p$$

where $$H_{gv} = \begin{bmatrix} H_g^{vv} \\ H_g^{vh} \end{bmatrix}, H_{gh} = \begin{bmatrix} H_g^{hv} \\ H_g^{hh} \end{bmatrix} \text{ and } B_{gv} = \begin{bmatrix} B_g^s \\ 0 \end{bmatrix}, B_{gh} = \begin{bmatrix} 0 \\ B_g^s \end{bmatrix}.$$

That is, the signals to vertically (horizontally) polarized subgroups are transmitted using vertically (horizontally) polarized transmit antennas. Note that, when $\chi_0 \approx 0$, $$H_{lp}^H B_{gq} \approx 0 \text{ for } p \neq q. \quad (13)$$

Therefore, when $\chi_0 \approx 0$, the received signal can be rewritten as $$y_g^p \approx H_{gp}^H B_{gp} P_{gp} d_g^p + n_g^p, \quad (14)$$

where the effective channel is $\overline{H}_{gp} = B_{gp}^H H_{gp}$ and by using $\overline{H}_{gp}$, the second precoding matrix $P_{gp}$ can be computed as the regularized ZF:

$$P_{gp,rzf} = \overline{\varsigma}_{gp} \hat{\overline{K}}_{gp} \hat{\overline{H}}_{gp}, \quad (15)$$

$$\hat{\overline{K}}_{gp} = \left(\hat{\overline{H}}_{gp} \hat{\overline{H}}_{gp}^H + \overline{B}/2\alpha I_{\overline{B}/2}\right)^{-1},$$

$$\overline{\varsigma}_{gp}^2 = \frac{\overline{N}/2}{\|B_{gp} P_{gp,rzf}\|_F^2}.$$

The above scheme is denoted as dual precoding with BD and subgrouping (BDS) based on both spatial correlation and polarization.

Figure 2:
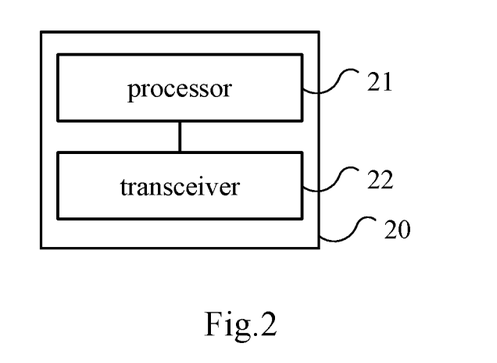
FIG. 2 shows a base station of an embodiment of the disclosure.

FIG. 2 shows a base station of an embodiment of the disclosure. As shown in FIG. 2 the base station 20 includes a processor 21 and a transceiver 22.

The processor 21 is configured to determine a first subgroup to which a first mobile station belongs, wherein the first mobile station is one of a plurality of mobile stations, the plurality of mobile stations are grouped into G groups based on spatial correlation, the mobile stations in each of the G groups are further grouped into S subgroups based on polarization, the mobile stations in a same subgroup have a same polarization and the mobile stations in different subgroups have different polarizations, G and S being positive integers.

The transceiver 22 is configured to communicate with the first mobile station according to the polarization of the first subgroup.

Therefore the embodiments of the disclosure utilize polarization jointly with the spatial correlation in dual structured procoding so that feedback overhead can be reduced.

The multi-polarized array is the first priority deployment for operators in LTE-A and massive MIMO systems. As compared with the scheme of dual precoding with BD, the feedback overhead of the scheme of dual precoding with BDS according to the disclosure can be further reduced, especially for the system with a large number of multiple polarized antennas.

In particular, the processor 21 may be implemented as processing unit such as a CPU or other kinds of processors, and the transceiver 22 may be implemented as interface or receiver/transmitter for transeiving signals from or to other network elements, with or without some basic signal processing functionalities.

Figure 3:
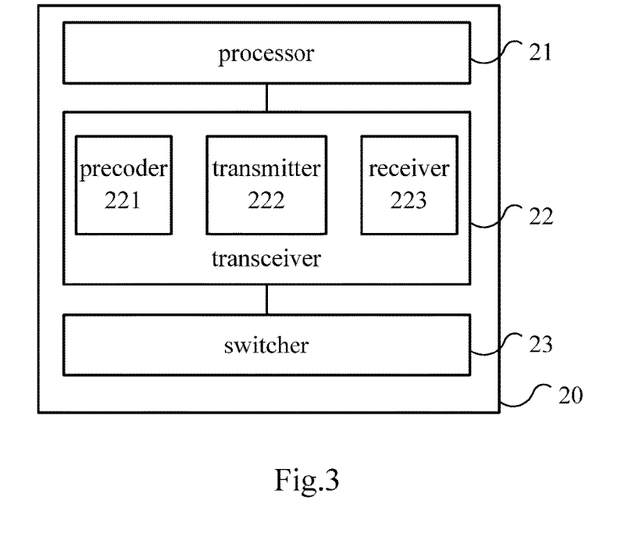
FIG. 3 shows a base station of another embodiment of the disclosure.

FIG. 3 shows a base station of another embodiment of the disclosure. The same or similar elements in FIG. 3 are illustrated with the same or similar reference signs as those in FIG. 2 and therefore redundant descriptions on such elements will be omitted.

As shown in FIG. 3 the transceiver 22 may include a precoder 221 and a transmitter 222. The precoder is configured to precode a data stream using a precoding matrix corresponding to the polarization of the first subgroup, and the transmitter 222 is configured to transmitting the precoded data stream to the first mobile station.

Alternatively, as another embodiment, the precoding matrix corresponding to the polarization of the first subgroup is designed as a dual structured matrix $$B_{gp} P_{gp}$$

where the first subgroup is the p-th subgroup in the g-th group, $B_{gp}$ is a preprocessing matrix determined based on a long-term channel estimation for the first subgroup, and $P_{gp}$ is matrix specific to the first mobile station.

Alternatively, as still another embodiment, $$P_{gp} = \bar{\varsigma}_{gp} \hat{K}_{gp} \hat{H}_{gp},$$

$$\hat{K}_{gp} = \left( \hat{H}_{gp} \hat{H}_{gp}^H + \bar{B}/2\alpha I_{B/2} \right)^{-1},$$

$$\bar{\varsigma}_{gp}^2 = \frac{\bar{N}/2}{\|B_{gp} P_{gp}\|_F^2}$$

where $H_{gp}$ is a channel matrix for the first subgroup, $\bar{B}$ is a design parameter that determines dimension of transformed channel based on long-term channel estimation, a is a regularization parameter, and $\bar{N}/2$ is the number of mobile stations in the first subgroup, as described in the above eq. (15).

Therefore the embodiments of the disclosure utilize polarization jointly with the spatial correlation in dual structured procoding so that feedback overhead can be reduced.

The multi-polarized array is the first priority deployment for operators in LTE-A and massive MIMO systems. As compared with the scheme of dual precoding with BD, the feedback overhead of the scheme of dual precoding with BDS according to the disclosure can be further reduced, especially for the system with a large number of multiple polarized antennas.

Furthermore, the disclosure may also propose a mode switching scheme based on the long-term CSIT (both polarization and spatial correlation) and the CSIT quality (the number of feedback bits). That is, the dual structured precoding scheme can be switched between that with BD and BDS.

In such an embodiment, the processor 21 may be further configured to determine a first group to which the first mobile station belongs, wherein the first group is one of the G groups, and the transceiver 22 may be further configured to communicate with the first mobile station according to the spatial correlation of the first group.

As shown in FIG. 3, the base station may further include a switcher 23 for controlling the communicating mode of the transceiver 22. In particular, the switcher 23 is configured to determine whether a first communicating mode or a second communicating mode is applied by the transceiver 22, wherein in the first communicating mode the transceiver 22 communicates with the first mobile station according to the spatial correlation of the first group (BD) and in the second communicating mode the transceiver 22 communicates with the first mobile station according to the polarization of the first subgroup (BDS).

Therefore the BS may adapt a proper dual structured procoding scheme based on the channel state so that the performance of the system can be improved.

Alternatively, the switcher 23 may determine, based on an inverse of XPD and/or number of feedback bits, whether the first communicating mode or the second communicating mode is applied.

Specifically, in the dual precoding with BD, to compute $P_g$ in eq. (ii), the k-th MS in the g-th group quantizes the short-term CSI $[G_g]_k$ and feed them back to the BS. In contrast, in the dual precoding with BDS, because the cross polarized channel $H_{gq}$, $q \neq p$ has no influence on the short-term precoding matrix $P_{gp}$, the MSs do not need to feed back the instantaneous CSI from cross polarized transmit antennas at BS. That is, the k-th MS having vertical (horizontal) polarization in the g-th group can quantize the first (last) r entries of the k-th column of $[G_g]_k$ and feed them back to the BS with the feedback amount reduced by half. Alternatively, more accurate CSIT is available under the same feedback amount compared to the dual precoding with BD. With the use of random matrix theory with a large dimension, when a large number of antennas are exploited at BS, the asymptotic SINR of BD and BDS can be analyzed and they can be expressed by the long-term CSI ($R_g^s$, $\chi_0$) and CSI quality (0 (perfect CSIT)$\leq \tau_{BD}^2$, $\tau_{BDS}^2 \leq 1$ (no CSIT)):

$$SINR_{BD}(\chi) \approx \frac{A_0(1 - \tau_{BD}^2)}{B_0(1 + D_0 \tau_{BD}^2) + (1 + E_0)(D_0 + 1)} \quad (16)$$

$$SINR_{BDS}(\chi) \approx \frac{A_0(1 - \tau_{BDS}^2)}{(B_0(1 + D_0 \tau_{BDS}^2) + (1 + E_0)(D_0 + 1))(1 + c_0 \chi)} \quad (17)$$

where $A_0$, $B_0$, $c_0$, $D_0$, $E_0$ are depend on $R_g^s$. Note that $SINR_{BD}(\chi)$ is independent of $\chi$. That is, $SINR_{BD}(\chi) \approx SINR_{BD}(0)$. In contrast, $$SINR_{BDS}(\chi) \approx \frac{SINR_{BDS}(\chi)}{(1+c_0\chi)}.$$

That is, SINR of the dual precoding with BDS decreases when $\chi$ increases. Note that, however, the feedback amount of BDS is the half of that required in BD. Accordingly, given the same feedback bits, the CSI quality is given as $\tau_{BDS} \approx \tau_{BD}^2$. For example, when $\tau_{BD} \approx 0.1$, $\tau_{BDS} \approx 0.01$. Based on these observation together with eq. (16) and (17), when $$\chi \leq (1+f(R_g^s))\tau^2 \text{ with } \tau_{BD} = \tau, \tag{18}$$

the dual precoding with BDS outperforms the dual precoding with BD. Alternatively, for a given number of feedback bits ($N_B$), when $$N_B \leq (2r-1)(\log_2(1+f(R_g^s)) - \log_2\chi), \tag{19}$$

the dual precoding with BDS outperforms the dual precoding with BD. When the number of feedback bits is not enough to describe the short-term CSIT accurately, the dual precoding with BDS exhibits a better performance than that with BD.

Figure 4:
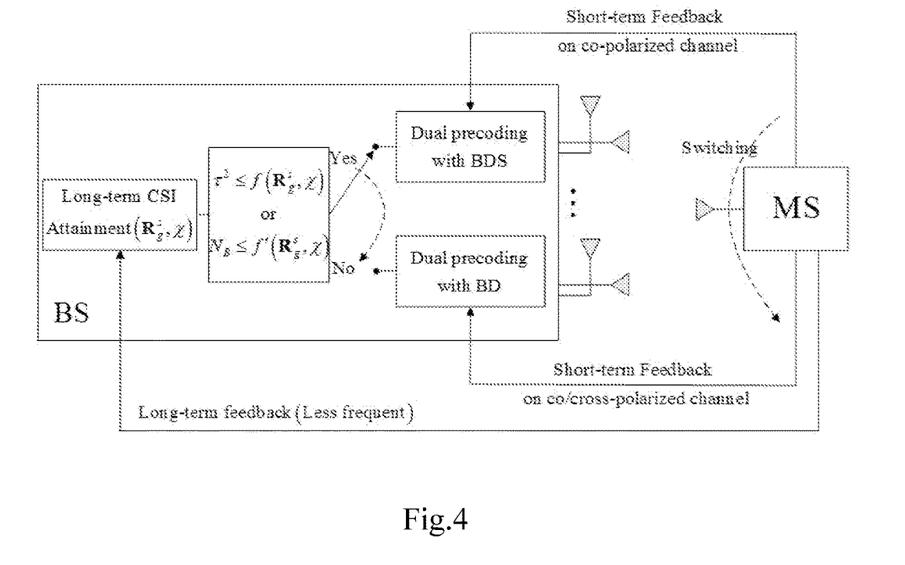
FIG. 4 shows a new dual precoding/feedback scheme applied in the system according to an embodiment of the disclosure.

FIG. 4 shows a new dual precoding/feedback scheme applied in the system according to an embodiment of the disclosure. In the embodiment of FIG. 4, the mode of dual precoding with BD and that with BDS may be switched based on inverse of XPD and/or number of feedback bits such as the above eq. (18) and eq. (19). The BS can determine which mode (BD vs BDS) would exhibit the best performance and inform it to MSs of each subgroups using one feedforward bit.

Furthermore, the proposed dual precoding/feedback scheme can be extended to multi-polarized antenna systems. For example, for tri-polarized antenna array, the channel can be modeled as $$H_g = (I_g \otimes (R_g^s)^{1/2}) \left( \begin{bmatrix} G_g^{vv} & G_g^{h_1 v} & G_g^{h_2 v} \\ G_g^{vh_1} & G_g^{h_1 h_1} & G_g^{h_2 h_1} \\ G_g^{vh_2} & G_g^{h_1 h_2} & G_g^{h_2 h_2} \end{bmatrix} \odot \left( X \otimes 1_{r \times \frac{N}{3}} \right) \right) \tag{20}$$

-continued
$$\approx \begin{bmatrix} (R_g^s)^{1/2} G_g^{vv} & \sqrt{\chi_0} (R_g^s)^{1/2} G_g^{h_1 v} & \sqrt{\chi_2} (R_g^s)^{1/2} G_g^{h_2 v} \\ \sqrt{\chi_0} (R_g^s)^{1/2} G_g^{vh_1} & (R_g^s)^{1/2} G_g^{h_1 h_1} & \sqrt{\chi_1} (R_g^s)^{1/2} G_g^{h_2 h_1} \\ \sqrt{\chi_2} (R_g^s)^{1/2} G_g^{vh_2} & \sqrt{\chi_1} (R_g^s)^{1/2} G_g^{h_1 h_2} & (R_g^s)^{1/2} G_g^{h_2 h_2} \end{bmatrix},$$

where the the polarization matrix X is given by $$X = \begin{bmatrix} 1 & \sqrt{\chi_0} & \sqrt{\chi_2} \\ \sqrt{\chi_0} & 1 & \sqrt{\chi_1} \\ \sqrt{\chi_2} & \sqrt{\chi_1} & 1 \end{bmatrix} \tag{21}$$

where the polarization parameters $\chi_0$, $\chi_1$, $\chi_2$ are the inverse of XPDs between the antennas with vertical polarization and horizontal polarization 1, with horizontal polarization 1 and horizontal polarization 2, and with vertical polarization and horizontal polarization 2, respectively. Assuming $\chi_0 = \chi_2$ which implies the XPDs between the antennas with vertical polarization and two different horizontal polarizations are the same, we can have 3 possible modes—grouping without any subgrouping, with three polarization subgroups (v, $h_1$, $h_2$), and with two polarization subgroups (v, ($h_1$, $h_2$)). Accordingly, similarly to what has been done in the dual polarized case, by using the long-term CSIT, BS can determine which mode would exhibit the best performance and inform it to MSs of each subgroups using two feedforward bits.

TABLE 1

SINR and short-term CSI dimension for tri-pol antenna array

| Modes | SINR | Short-term CSI dimension |
|---|---|---|
| BD | $SINR_{BD}(\chi_0, \chi_1) \approx SINR_{BD}(0,0)$ | $3r$ |
| BDS with (v, $h_1$, $h_2$) | $SINR_{3sub}(\chi_0, \chi_1) \approx \dfrac{SINR_{3sub}(0, 0)}{(1 + c_{vh}\chi_0 + c_{h_1 h_2}\chi_1)}$ | $r$ |
| BDS with (v, ($h_1$, $h_2$)) | $SINR_{2sub}(\chi_0, \chi_1) \approx \dfrac{SINR_{2sub}(0, 0)}{(1 + c_{vh}\chi_0)}$ | $r$ for vertically polarized MSs<br><br>$2r$ for horizontally polarized MSs |

In the 3D precoding scheme, the spatial correlation depends on both the azimuth and the elevation angles of the multi-paths. As an example, if BS has an $M_E \times M_A$ uniform planar array with dual polarized antennas, the vectorized channel to the k-th user in the g-th group of the l-th elevation region can be modeled as $$h_{g_k l} = ((I_2 \otimes U_{glA}) \otimes U_{lE})(\Lambda_{glA}^{1/2} \otimes \Lambda_{lE}^{1/2}) g_{g_k l} \in \mathbb{C}^{2M_A M_E \times 1}, \tag{22}$$

where $\Lambda_{glA}$ and $\Lambda_{lE}$ are the $r_{glA} \times r_{glA}$ and $r_{lE} \times r_{lE}$ diagonal matrices with non-zero eigenvalues of the spatial correlation matrices $R_{glA}^s$ and $R_{lE}^s$ over the azimuth and elevation directions, respectively, and $U_{glA}$ and $U_{lE}$ are the matrices of the associated eigenvectors. Here, $g_{g_k l} = [g_{g_k lv}^T \ \chi_0 g_{g_k lh}^T]^T \in \mathbb{C}^{2r_A r_E \times j}$ ($g_{g_k l} = [\chi_0 g_{g_k lv}^T \ g_{g_k lh}^T]^T$) is the short-term CSI for vertically (horizontally) polarized MSs. Then, the 3D dual structured precoding signal can be designed as $$x = \sum_{l=1}^{L} \left( \sum_{g=1}^{G} V_{gl} d_{gl} \right) \otimes q_l, \tag{23}$$

where $q_l$ is the preprocessing vector based on $R_{lE}^s$ that nulls out the interferences from the other elevation regions. Here, $q_l$ can be computed such that $q_l^H U_{-lE}=0$ with $U_{-lE}=[U_{1E}, \ldots, U_{l-1E}, U_{l+1E}, \ldots, U_{LE}]$. Then, the received signal $y_{gl}$ of the gth group in lth elevation region is derived as $$y_{gl} = \sum_{g'=1}^{G} G_{gl}^H (\Lambda_{glA}^{1/2} \otimes \Lambda_{lE}^{1/2})(((I_2 \otimes U_{glA})^H V_{g'l} d_{g'l}) \otimes (U_{lE}^H q_l)) + \quad (24)$$

$$n_{gl},$$

$$= \sum_{g'=1}^{G} \sqrt{\tilde{\lambda}_l} G_{gl}^H \Lambda_{glA}^{1/2} (I_2 \otimes U_{glA})^H V_{g'l} d_{g'l} + n_{gl},$$

where $\tilde{\lambda}_l = q_l^H R_{lE}^s q_l$ which implies a vertical beamforming gain. That is, after the vertical preprocessing based on long-term CSIT (elevation), eq. (24) is the (2-D spatial domain) equivalent system and the proposed disclosure can be applied to eq. (24) with a channel scaling constant $\tilde{\lambda}_l$ for the lth elevation region.

Alternatively, as yet another embodiment, channel estimation procedure and reference signaling may be optimized for dual structured precoding/feedback schemes. For example, as shown in FIG. 3, the transceiver 22 may include a transmitter 222 and a receiver 223.

The transmitter 222 may send a first CSI-RS (referred to as CSI-RS1) to the first mobile station, enabling the first mobile station to obtain a long-term channel estimation based on the first CSI-RS.

The receiver 223 may receive the long-term channel estimation from the first mobile station, the long-term channel estimation comprising $R_g^s$ and $\chi$ where $R_g^s$ is spatial correlation matrix for the g-th group and $\chi$ is the inverse of XPD.

Further, the transmitter 222 may send a second CSI-RS (referred to as CSI-RS2) to the first mobile station, informing the first mobile station of the determined communicating mode and enabling the first mobile station to obtain a group-polarization specific CSI from based on the second CSI-RS. The receiver 223 may receive, from the first mobile station, the group-polarization specific CSI which is used to obtain a user specific precoding matrix.

Figure 5:
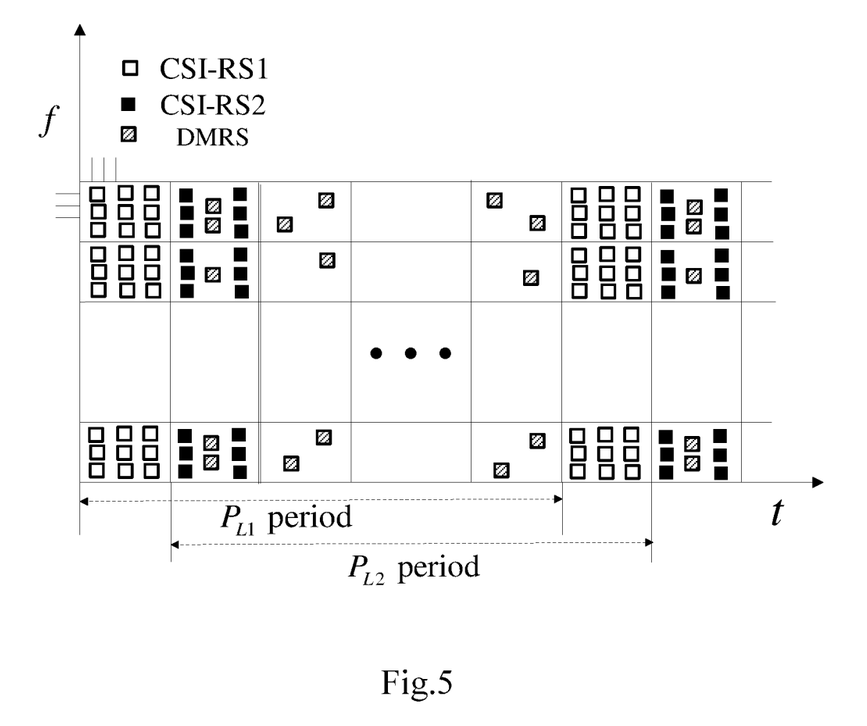
FIG. 5 shows an example of Pilot (reference signaling) allocation for dual structured precoding/feedback

In a particular embodiment, to implement the disclosure of the dual precoding/feedback with a large number of transmit antennas at BS, as one example of the channel acquisition procedure, it can be designed as FIG. 5 which shows an example of Pilot (reference signaling) allocation for dual structured precoding/feedback.

In FIG. 5, CSI-RS1 is used for the coarse long-term CSI ($R_g^s$, $\chi$) acquisition and may require a large number of pilot symbols, but is less frequently transmitted. Then, BS can determine the mode between BD and BDS and compute $B_g$ ($B_{gp}$) for BD (BDS). BS then transmits the pilots precoded with $B_g$ ($B_{gp}$) (group-polarization specific CSI-RS2) and inform the selected mode via a single feedforward bit (or multiple bits if more polarizations are used). MS then measures $\widetilde{H_g B_g}$ ($\widetilde{H_{gp} B_{gp}}$) using CSI-RS2 and reports its quantized version to BS. Based on the reported CSI, BS can compute the user specific precoding matrix $P_g$ ($P_{gp}$) and precode the data streams using the precoding matrix $B_g P_g$ ($B_{gp} P_{gp}$). Here, BS also transmits precoded (user/stream-specific) DMRS and the MS can estimate $\widetilde{H_g B_g P_g}$ ($\widetilde{H_{gp} B_{gp} P_{gp}}$) which is used in decoding the streams.

Therefore, the channel estimation procedure and reference signaling can be optimized for dual structured precoding schemes.

A new codebook may be designed for short term CSI feedback in the dual structured precoding schemes. Alternatively, as another embodiment, the transceiver 22 is configured to communicate with the first mobile station using a codebook corresponding to the polarization of the first subgroup, wherein in the codebook the element indicating another polarization than the polarization of the first subgroup has a value of 0.

In particular, in the case of bi-polarized antenna array (e.g. polarization V and H), for BD, the codebook structure would write as $$C = \left\{ \begin{bmatrix} c_{v1} \\ c_{h1} \end{bmatrix}, \ldots, \begin{bmatrix} c_{vN} \\ c_{hN} \end{bmatrix} \right\}.$$

On the other hand, for BDS, the codebook should be defined only for half of the antennas (belonging to the same polarization). We can build the codebook for BDS as follows $$C_v = \left\{ \begin{bmatrix} c_1 \\ 0 \end{bmatrix}, \ldots, \begin{bmatrix} c_N \\ 0 \end{bmatrix} \right\}$$

$$C_h = \left\{ \begin{bmatrix} 0 \\ c_1 \end{bmatrix}, \ldots, \begin{bmatrix} 0 \\ c_N \end{bmatrix} \right\}$$

for each polarization (e.g. polarization V and H) respectively. Hence the same vectors $c_1$ to $c_N$ can be used for both polarizations but mapped to different entries of $C_v$ and $C_h$. The MS would use $C$, $C_v$ or $C_h$ depending on the bit indication transmitted by the BS and the MS polarization.

Figure 6:
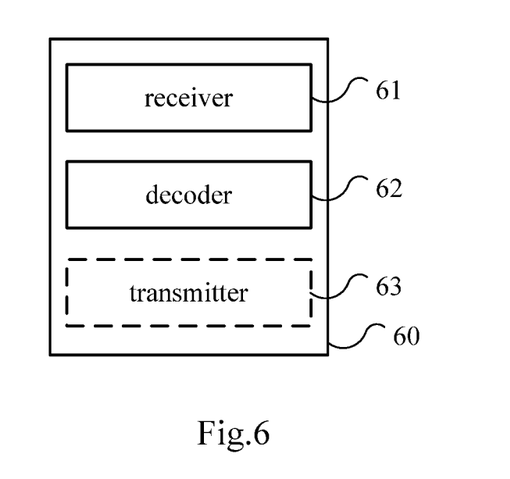
FIG. 6 shows a mobile station according to an embodiment of the disclosure.

FIG. 6 shows a mobile station according to an embodiment of the disclosure. As shown in FIG. 6, the mobiles station 60 includes a receiver 61 and a decoder 62.

The receiver 61 is configured to receive, from a base station, a first data stream, wherein the first data stream is precoded by the base station using a precoding matrix corresponding to a polarization of a first subgroup, the mobile station belongs to the first subgroup, the mobile station is one of a plurality of mobile stations, the plurality of mobile stations are grouped into G groups based on spatial correlation, the mobile stations in each of the G groups are further grouped into S subgroups based on polarization, the mobile stations in a same subgroup have a same polarization and the mobile stations in different subgroups have different polarizations, G and S being positive integers.

The decoder 62 is configured to decode the first data stream according to the polarization of the first subgroup.

Therefore the embodiments of the disclosure utilize polarization jointly with the spatial correlation in dual structured procoding so that feedback overhead can be reduced.

The multi-polarized array is the first priority deployment for operators in LTE-A and massive MIMO systems. As compared with the scheme of dual precoding with BD, the feedback overhead of the scheme of dual precoding with BDS according to the disclosure can be further reduced, especially for the system with a large number of multiple polarized antennas.

Alternatively or additionally, as another embodiment, the receiver 61 may be further configured to receive, from the base station, a second data stream, wherein the second data stream is precoded by the base station using a precoding matrix corresponding to a spatial correlation of a first group, the mobile station belongs to the first group, and the first group is one of the G groups.

The decoder 62 may be further configured to decode the second data stream according to the spatial correlation of the first group.

Therefore the mobile station can switch between the BD mode and the BDS mode so that performance of the system can be improved.

Alternatively, the mobile station 60 may further comprises a transmitter 63. The receiver 61 may receive a first CSI-RS from the base station, and the transmitter may send, to the base station, a long-term channel estimation obtained based on the first CSI-RS. The long-term channel estimation comprises $R_g^s$ and $\chi$ where $R_g^s$ is spatial correlation matrix for the g-th group and $\chi$ is the inverse of cross polar discrimination XPD.

Alternatively, the receiver 61 may further receive, from the base station, a second CSI-RS informing of a communicating mode determined by the base station wherein if the communicating mode is a first communicating mode the base station precodes the first data stream according to the spatial correlation of the first group and if the communicating mode is a second communicating mode the base station precodes the second data stream according to the polarization of the first subgroup, and the transmitter 63 may further send, to the base station, a group-polarization specific CSI obtained based on the second CSI-RS enabling the base station to obtain a user specific precoding matrix based on the group-polarization specific CSI.

Therefore, the channel estimation procedure and reference signaling can be optimized for dual structured precoding schemes.

Alternatively, the receiver 61 and the transmitter 63 are further configured to use, according to the communicating mode informed by the second CSI-RS, a codebook corresponding to the polarization of the first subgroup or a codebook corresponding to the spatial correlation of the first group, wherein in the codebook corresponding to the polarization of the first subgroup the element indicating another polarization than the polarization of the first subgroup has a value of 0.

In particular, in the case of bi-polarized antenna array (e.g. polarization V and H), for BD, the codebook structure would write as $$C = \left\{ \begin{bmatrix} c_{v1} \\ c_{h1} \end{bmatrix}, \ldots, \begin{bmatrix} c_{vN} \\ c_{hN} \end{bmatrix} \right\}.$$

On the other hand, for BDS, the codebook should be defined only for half of the antennas (belonging to the same polarization). We can build the codebook for BDS as follows $$C_v = \left\{ \begin{bmatrix} c_1 \\ 0 \end{bmatrix}, \ldots, \begin{bmatrix} c_N \\ 0 \end{bmatrix} \right\}$$

$$C_h = \left\{ \begin{bmatrix} 0 \\ c_1 \end{bmatrix}, \ldots, \begin{bmatrix} 0 \\ c_N \end{bmatrix} \right\}$$

for each polarization (e.g. polarization V and H) respectively. Hence the same vectors $c_1$ to $c_N$ can be used for both polarizations but mapped to different entries of $C_v$ and $C_h$.

The MS would use C, $C_v$ or $C_h$ depending on the bit indication transmitted by the BS and the MS polarization.

Figure 7:
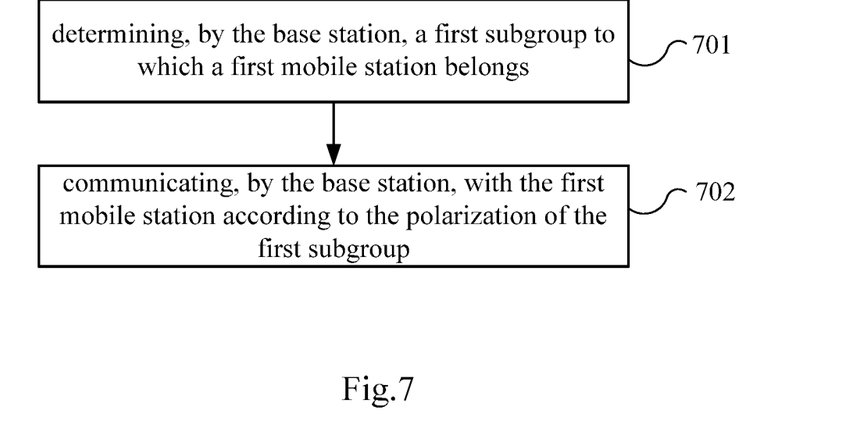
FIG. 7 is a method for mobile communication according to an embodiment of the disclosure.

FIG. 7 is a method for mobile communication according to an embodiment of the disclosure. The method of FIG. 7 is performed by a base station, such as, for example, the base station 20 in FIG. 2 and FIG. 3.

701, determining, by the base station, a first subgroup to which a first mobile station belongs, wherein the first mobile station is one of a plurality of mobile stations, the plurality of mobile stations are grouped into G groups based on spatial correlation, the mobile stations in each of the G groups are further grouped into S subgroups based on polarization, the mobile stations in a same subgroup have a same polarization and the mobile stations in different subgroups have different polarizations, G and S being positive integers.

702, communicating, by the base station, with the first mobile station according to the polarization of the first subgroup.

Therefore the embodiments of the disclosure utilize polarization jointly with the spatial correlation in dual structured procoding so that feedback overhead can be reduced.

The multi-polarized array is the first priority deployment for operators in LTE-A and massive MIMO systems. As compared with the scheme of dual precoding with BD, the feedback overhead of the scheme of dual precoding with BDS according to the disclosure can be further reduced, especially for the system with a large number of multiple polarized antennas.

Alternatively, in the step of 702, the base station may precode a data stream using a precoding matrix corresponding to the polarization of the first subgroup; and transmit the precoded data stream to the first mobile station.

Alternatively, the precoding matrix corresponding to the polarization of the first subgroup is designed as a dual structured matrix $$B_{gp}P_{gp}$$

where the first subgroup is the p-th subgroup in the g-th group, $B_{gp}$ is a preprocessing matrix determined based on a long-term channel estimation for the first subgroup, and $P_{gp}$ is matrix specific to the first mobile station.

Alternatively, $$P_{gp} = \bar{\varsigma}_{gp} \hat{K}_{gp} \hat{H}_{gp},$$

$$\hat{K}_{gp} = \left( \hat{H}_{gp} \hat{H}_{gp}^H + \bar{B}/2\alpha I_{B/2} \right)^{-1},$$

$$\bar{\varsigma}_{gp}^2 = \frac{\bar{N}/2}{\|B_{gp}P_{gp}\|_F^2}$$

where $H_{gp}$ is a channel matrix for the first subgroup, $\bar{B}$ is a design parameter that determines dimension of transformed channel based on long-term channel estimation, $\alpha$ is a regularization factor, and $\bar{N}/2$ is the number of mobile stations in the first subgroup.

Alternatively, the base station may further determine a first group to which the first mobile station belongs, wherein the first group is one of the G groups; and communicate with the first mobile station according to the spatial correlation of the first group.

Alternatively, before communicating with the first mobile station, the base station may determine whether a first communicating mode or a second communicating mode is applied, wherein in the first communicating mode the base station communicates with the first mobile station according to the spatial correlation of the first group and in the second communicating mode the base station communicates with the first mobile station according to the polarization of the first subgroup.

Alternatively, the base station may determine, based on an inverse of XPD and/or number of feedback bits, whether the first communicating mode or the second communicating mode is applied. For example, the above eq. (18) and eq. (19) can be used.

Therefore the BS may adapt a proper dual structured procoding scheme based on the channel state so that the performance of the system can be improved.

Alternatively, as yet another embodiment, channel estimation procedure and reference signaling may be optimized for dual structured precoding/feedback schemes. In particular, the base station may send a first CSI-RS to the first mobile station, enabling the first mobile station to obtain a long-term channel estimation based on the first CSI-RS, and receive the long-term channel estimation from the first mobile station, the long-term channel estimation comprising $R_g^s$ and $\chi$ where $R_g^s$ is spatial correlation matrix for the gth group and $\chi$ is the inverse of XPD.

Alternatively, as yet another embodiment, the base station may send a second CSI-RS to the first mobile station, informing the first mobile station of the determined communicating mode and enabling the first mobile station to obtain a group-polarization specific CSI from based on the second CSI-RS, receive the group-polarization specific CSI from the first mobile station, and obtain a user specific precoding matrix according to the group-polarization specific CSI.

Therefore, the channel estimation procedure and reference signaling can be optimized for dual structured precoding schemes.

A new codebook may be designed for short term CSI feedback in the dual structured precoding schemes. Alternatively, as another embodiment, the base station may communicate with the first mobile station using a codebook corresponding to the polarization of the first subgroup, wherein in the codebook the element indicating another polarization than the polarization of the first subgroup has a value of 0.

In particular, in the case of bi-polarized antenna array (e.g. polarization V and H), for BD, the codebook structure would write as $$C = \left\{ \begin{bmatrix} c_{v1} \\ c_{h1} \end{bmatrix}, \ldots, \begin{bmatrix} c_{vN} \\ c_{hN} \end{bmatrix} \right\}.$$

On the other hand, for BDS, the codebook should be defined only for half of the antennas (belonging to the same polarization). We can build the codebook for BDS as follows $$C_v = \left\{ \begin{bmatrix} c_1 \\ 0 \end{bmatrix}, \ldots, \begin{bmatrix} c_N \\ 0 \end{bmatrix} \right\}$$

$$C_h = \left\{ \begin{bmatrix} 0 \\ c_1 \end{bmatrix}, \ldots, \begin{bmatrix} 0 \\ c_N \end{bmatrix} \right\}$$

for each polarization (e.g. polarization V and H) respectively. Hence the same vectors $c_1$ to $c_N$ can be used for both polarizations but mapped to different entries of $C_v$ and $C_h$.

The MS would use C, $C_v$ or $C_h$ depending on the bit indication transmitted by the BS and the MS polarization.

Figure 8:
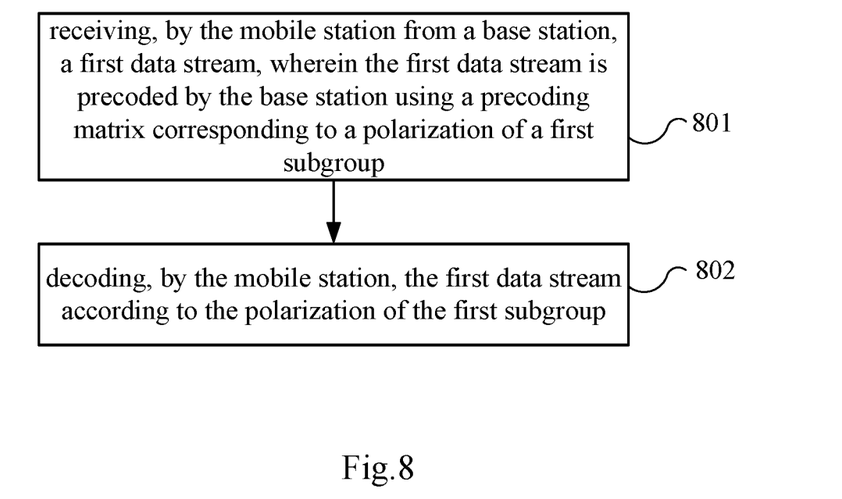
FIG. 8 shows another method for mobile communication according to an embodiment of the disclosure.

FIG. 8 shows another method for mobile communication according to an embodiment of the disclosure. The method of FIG. 8 is performed by a mobile station, such as, for example, the mobile station 60 in FIG. 6. The method of FIG. 8 includes the following steps.

801. Receiving, by the mobile station from a base station, a first data stream, wherein the first data stream is precoded by the base station using a precoding matrix corresponding to a polarization of a first subgroup, the mobile station belongs to the first subgroup, the mobile station is one of a plurality of mobile stations, the plurality of mobile stations are grouped into G groups based on spatial correlation, the mobile stations in each of the G groups are further grouped into S subgroups based on polarization, the mobile stations in a same subgroup have a same polarization and the mobile stations in different subgroups have different polarizations, G and S being positive integers.

802. Decoding, by the mobile station, the first data stream according to the polarization of the first subgroup.

Therefore the embodiments of the disclosure utilize polarization jointly with the spatial correlation in dual structured precoding so that feedback overhead can be reduced.

The multi-polarized array is the first priority deployment for operators in LTE-A and massive MIMO systems. As compared with the scheme of dual precoding with BD, the feedback overhead of the scheme of dual precoding with BDS according to the disclosure can be further reduced, especially for the system with a large number of multiple polarized antennas.

Alternatively, the mobile station may further receive from the base station, a second data stream, wherein the second data stream is precoded by the base station using a precoding matrix corresponding to a spatial correlation of a first group, the mobile station belongs to the first group, and the first group is one of the G groups; and decode the second data stream according to the spatial correlation of the first group.

Alternatively, the mobile station may further receive a first CSI-RS from the base station, obtain a long-term channel estimation based on the first CSI-RS, and send, to the base station, the long-term channel estimation. The long-term channel estimation comprises $R_g^s$ and $\chi$ where $R_g^s$ is spatial correlation matrix for the g-th group and $\chi$ is the inverse of cross polar discrimination XPD.

Alternatively, the mobile station may further receive, from the base station, a second CSI-RS informing of a communicating mode determined by the base station wherein if the communicating mode is a first communicating mode the base station precodes the first data stream according to the spatial correlation of the first group and if the communicating mode is a second communicating mode the base station precodes the second data stream according to the polarization of the first subgroup; obtain a group-polarization specific CSI based on the second CSI-RS and send, to the base station, the group-polarization specific CSI enabling the base station to obtain a user specific precoding matrix based on the group-polarization specific CSI.

Therefore, the channel estimation procedure and reference signaling can be optimized for dual structured precoding schemes.

A new codebook may be designed for short term CSI feedback in the dual structured precoding schemes. Alternatively, as another embodiment, the mobile station may communicate with the base station using a codebook corresponding to the polarization of the first subgroup, wherein in the codebook the element indicating another polarization than the polarization of the first subgroup has a value of 0.

In particular, in the case of bi-polarized antenna array (e.g. polarization V and H), for BD, the codebook structure would write as $$C = \left\{ \begin{bmatrix} c_{v1} \\ c_{h1} \end{bmatrix}, \ldots, \begin{bmatrix} c_{vN} \\ c_{hN} \end{bmatrix} \right\}.$$

On the other hand, for BDS, the codebook should be defined only for half of the antennas (belonging to the same polarization). We can build the codebook for BDS as follows $$C_v = \left\{ \begin{bmatrix} c_1 \\ 0 \end{bmatrix}, \ldots, \begin{bmatrix} c_N \\ 0 \end{bmatrix} \right\}$$

$$C_h = \left\{ \begin{bmatrix} 0 \\ c_1 \end{bmatrix}, \ldots, \begin{bmatrix} 0 \\ c_N \end{bmatrix} \right\}$$

for each polarization (e.g. polarization V and H) respectively. Hence the same vectors $c_1$ to $c_N$ can be used for both polarizations but mapped to different entries of $C_v$ and $C_h$. The MS would use C, $C_v$ or $C_h$ depending on the bit indication transmitted by the BS and the MS polarization.

Figure 9:
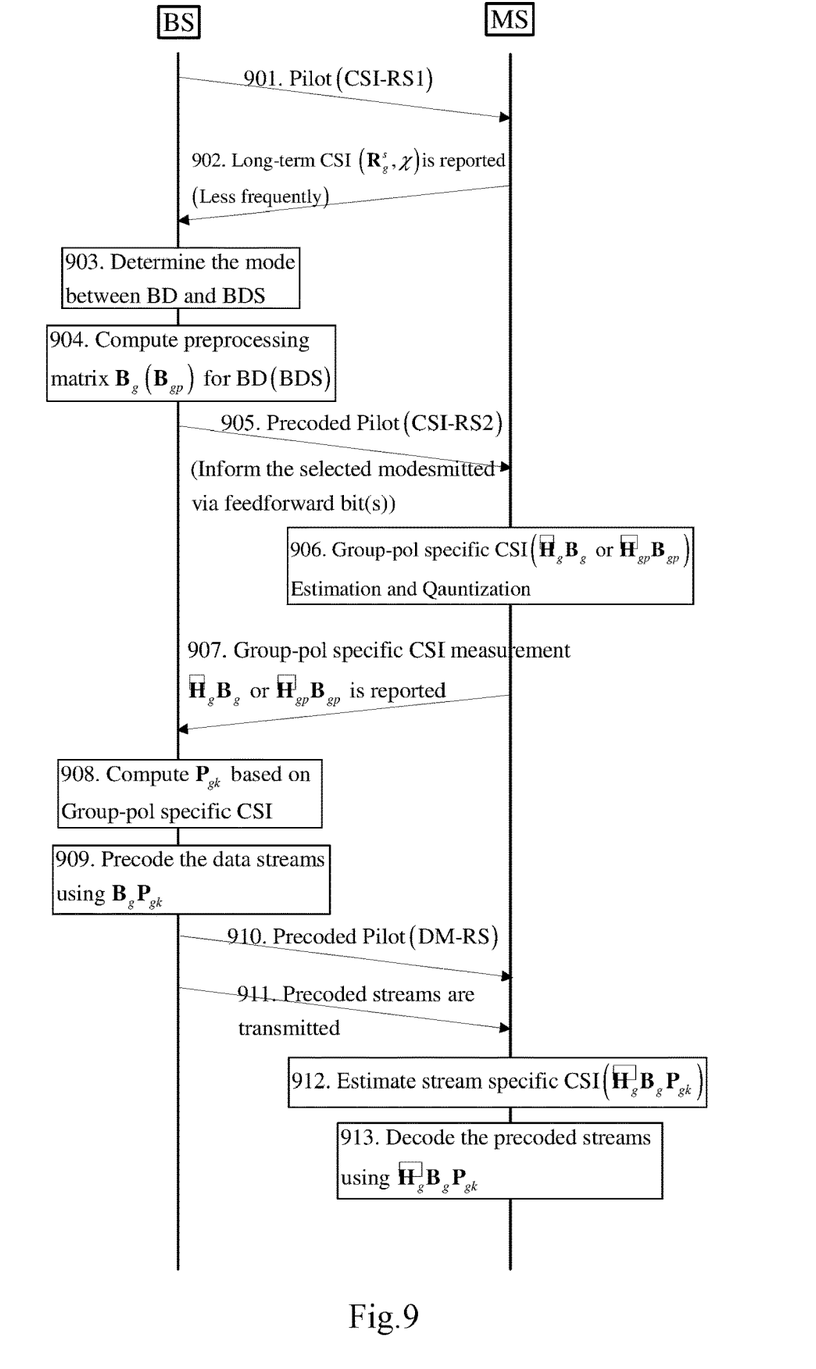
FIG. 9 shows a communicating procedure of a base station and a mobile station according to an embodiment of the disclosure.

FIG. 9 shows a communicating procedure of a base station and a mobile station according to an embodiment of the disclosure. The communication procedure includes the following steps.

901. CSI-RS1 is transmitted from the BS to the MS for the coarse long-term CSI ($R_g^s$, $\chi$) acquisition.

CSI-RS1 may require a large number of pilot symbols, but is less frequently transmitted.

902. Long-term CSI ($R_g^s$, $\chi$) is reported from the MS to the BS.

903. The BS can determine the mode between BD and BDS based on the long-term CSI ($R_g^s$, $\chi$). For example, the above eq. (18) and eq. (19) may be used.

904. The BS may compute $B_g$ for BD or $B_{gp}$ for BDS.

905. The BS transmits the pilots precoded with $B_g$ or $B_{gp}$ (i.e. group-polarization specific CSI-RS2) and inform the selected mode via a single feedforward bit (or multiple bits if more polarizations are used).

906. The MS then measures $\widetilde{H_g B_g}$ ($\widetilde{H_{gp} B_{gp}}$) using CSI-RS2.

907. The MS reports its quantized version to the BS.

908. Based on the reported CSI, the BS can compute the user specific precoding matrix $P_g$ ($P_{gp}$).

909. The BS precodes the data streams using the precoding matrix $B_g P_g$ ($B_{gp} P_{gp}$).

911. The BS also transmits precoded (user/stream-specific) DMRS to the MS.

912. The MS can estimate $\widetilde{H_g B_g P_g}$ ($\widetilde{H_{gp} B_{gp} P_{gp}}$).

913. The MS may use $\widetilde{H_g B_g P_g}$ ($\widetilde{H_{gp} B_{gp} P_{gp}}$) in decoding the streams.

Therefore, the channel estimation procedure and reference signaling can be optimized for dual structured precoding schemes.

In the embodiments of the disclosure, the MS may be any one as follows, may be stationary or mobile, and the example of the stationary MS may include user equipment, terminal, mobile station, subscriber unit or station, etc. The example of the mobile MS may include cellular phone, personal digital assistant (PDA), wireless modem, wireless communication device, handheld device, laptop computer, cordless phone or wireless local loop (WLL) station, etc.

It is to be noted that the term such as "first, second, and so on" used in the context is only used to distinguish one entity or operation from another entity or operation, and is not intended to the actual relationship or sequence between these entities or operations. Furthermore, the term "include", "comprise" or the other variation is intended to a inclusion in inclusive sense, but not in exclude sense, thus the process, method, object or equipment including elements will not only include these elements, but also include other elements which are not clearly listed, or further include the elements inherent to the process, method, object or equipment. Unless defined otherwise, the elements defined by the term "comprise a . . . " would not exclude the presence of other identical elements in the process, method, object or equipment including the stated elements.

From the description of the embodiment of the disclosure, ones skilled in the art would clearly understand that the disclosure can be achieved by software together with the necessary general-purpose hardware, and certainly can also be achieved only by hardware, but the former would be preferred. Based on this understanding, the solution of the disclosure naturally can be implemented in the form of software products, and the software products can be stored in storage media, such as ROM/RAM, hard disks, compact disks and the like, containing several instructions capable of enabling a computer device (personal computer, server or network device, etc.) to execute the method described in the embodiments or part of the embodiments.

While the disclosure has been described by way of the preferred embodiments, it is to be noted that many modifications or variations can be made in the embodiments by ordinary ones skilled in the art as these modifications or variations should also fall within the protection scope of the disclosure.

What is claimed is:

1. A base station, comprising:
a processor, configured to determine a first subgroup to which a first mobile station belongs, wherein the first mobile station is one of a plurality of mobile stations, the plurality of mobile stations are grouped into G groups based on spatial correlation, wherein mobile stations in each of the G groups are further grouped into S subgroups based on polarization, wherein mobile stations in a same subgroup have a same polarization and mobile stations in different subgroups have different polarizations, wherein G and S are positive integers; and
a transceiver, configured to communicate with the first mobile station according to a polarization of the first subgroup, wherein the transceiver comprises:
a precoder, configured to precode a data stream using a precoding matrix corresponding to the first polarization of the first subgroup, wherein the precoding matrix corresponding to the polarization of the first subgroup is designed as a dual structured matrix $B_{gp} P_{gp}$, wherein the first subgroup is a p-th subgroup in a g-th group, wherein $B_{gp}$ is a preprocessing matrix determined based on a long-term channel estimation for the first subgroup, and wherein $P_{gp}$ is a matrix specific to the first mobile station; and
a transmitter, configured to transmit the precoded data stream to the first mobile station.

2. The base station according to claim 1, wherein $$P_{gp} = \bar{\varsigma}_{gp} \hat{\bar{K}}_{gp} \hat{\bar{H}}_{gp}, \hat{\bar{K}}_{gp} = \left(\hat{\bar{H}}_{gp} \hat{\bar{H}}_{gp}^H + \bar{B}/2\alpha I_{\bar{B}/2}\right)^{-1},$$

$$\bar{\varsigma}_{gp}^2 = \frac{\bar{N}/2}{\|\bar{B}_{gp} P_{gp}\|_F^2}$$

where $H_{gp}$ is a channel matrix for the first subgroup, $\bar{B}$ is a design parameter that determines dimension of transformed channel based on long-term channel estimation, $\alpha$ is a regularization factor, and $\bar{N}/2$ is a number of mobile stations in the first subgroup.

3. The base station according to claim 1, wherein the processor is further configured to determine a first group to which the first mobile station belongs, wherein the first group is one of the G groups; and wherein the transceiver is further configured to communicate with the first mobile station according to the spatial correlation of the first group.

4. The base station according to claim 3, further comprising:

a switcher, configured to determine whether a first communicating mode or a second communicating mode is applied by the transceiver, wherein in the first communicating mode the transceiver communicates with the first mobile station according to the spatial correlation of the first group and in the second communicating mode the transceiver communicates with the first mobile station according to the polarization of the first subgroup.

5. The base station according to claim 4, wherein the switcher determines, based on an inverse of cross polar discrimination (XPD) or a number of feedback bits, whether the first communicating mode or the second communicating mode is applied, whether the first communicating mode or the second communicating mode is applied.

6. The base station according to claim 5, wherein the transceiver comprises:

a transmitter, configured to send a first channel state information reference signal (CSI-RS) to the first mobile station, enabling the first mobile station to obtain a long-term channel estimation based on the first CSI-RS; and a receiver, configured to receive the long-term channel estimation from the first mobile station, the long-term channel estimation comprising $R_g^s$ and $\chi$, wherein $R_g^s$ is spatial correlation matrix for a g-th group and $\chi$ is an inverse of XPD.

7. The base station according to claim 6, wherein the transmitter is further configured to send a second CSI-RS to the first mobile station, informing the first mobile station of the determined communicating mode and enabling the first mobile station to obtain a group-polarization specific channel state information (CSI) based on the second CSI-RS; and the receiver is further configured to receive, from the first mobile station, the group-polarization specific CSI which is used to obtain a user specific precoding matrix.

8. The base station according to claim 1, wherein the transceiver is further configured to communicate with the first mobile station using a codebook corresponding to the first polarization of the first subgroup, wherein the codebook comprises an element indicating another polarization than the polarization of the first subgroup having a value of 0.

9. A mobile station, comprising:

a receiver, configured to:
    receive, from a base station, a first data stream, wherein the first data stream is precoded by the base station using a first precoding matrix corresponding to a first polarization of a first subgroup, wherein the mobile station belongs to the first subgroup, wherein the mobile station is one of a plurality of mobile stations, wherein the plurality of mobile stations are grouped into G groups based on spatial correlation, wherein mobile stations in each of the G groups are further grouped into S subgroups based on polarization, wherein mobile stations in a same subgroup have a same polarization and mobile stations in different subgroups have different polarizations, and wherein G and S are positive integers; and
    receive, from the base station, a second data stream, different from the first data stream, wherein the second data stream is precoded by the base station using a second precoding matrix corresponding to a spatial correlation of a first group of the G groups, and wherein the first group comprises the mobile station;

a decoder, configured to decode the first data stream according to the first polarization of the first subgroup; and a transmitter, configured to send, to the base station, a long term channel estimation obtained based on a first channel state information reference signal (CSI-RS), wherein the long term channel estimation comprises $R_g^s$ and $\chi$, wherein $R_g^s$ is a spatial correlation matrix for a g-th group, and wherein $\chi$ is an inverse of cross polar discrimination (XPD).

10. The mobile station according to claim 9,
wherein the decoder is further configured to decode the second data stream according to the spatial correlation of the first group.

11. The mobile station according to claim 10, wherein the receiver is further configured to receive the first CSI-RS from the base station.

12. The mobile station according to claim 11, wherein:
the receiver is further configured receive, from the base station, a second CSI-RS informing of a communicating mode determined by the base station, wherein when the communicating mode is a first communicating mode the base station precodes the first data stream according to the spatial correlation of the first group, and when the communicating mode is a second communicating mode the base station precodes the second data stream according to the first polarization of the first subgroup; and
the transmitter is further configured to send, to the base station, a group-polarization specific channel state information (CSI) obtained based on the second CSI-RS enabling the base station to obtain a user specific precoding matrix based on the group-polarization specific CSI.

13. The mobile station according to claim 12, wherein the receiver and the transmitter are further configured to use, according to the communicating mode informed by the second CSI-RS, a first codebook corresponding to the first polarization of the first subgroup or a second codebook corresponding to the spatial correlation of the first group, wherein the first codebook comprises an element indicating a second polarization having a value of 0, and wherein the second polarization is different from the first polarization of the first subgroup.

14. A method, comprising:
  receiving, by a mobile station from a base station, a first data stream, wherein the first data stream is precoded by the base station using a precoding matrix corresponding to a first polarization of a first subgroup, wherein the mobile station belongs to the first subgroup, wherein the mobile station is one of a plurality of mobile stations, wherein the plurality of mobile stations are grouped into G groups based on spatial correlation, wherein mobile stations in each of the G groups are further grouped into S subgroups based on polarization, wherein mobile stations in a same subgroup have a same polarization and mobile stations in different subgroups have different polarizations, and wherein G and S are positive integers;
  decoding, by the mobile station, the first data stream according to the first polarization of the first subgroup;
  receiving, by the mobile station from the base station, a second data stream, different from the first data stream, wherein the second data stream is precoded by the base station using a second precoding matrix corresponding to a spatial correlation of a first group of the G groups, and wherein the first group comprises the mobile station; and
  transmitting, to the base station, a long term channel estimation obtained based on a first channel state information reference signal (CSI-RS), wherein the long term channel estimation comprises $R_g^s$ and $\chi$, wherein $R_g^s$ is a spatial correlation matrix for a g-th group, and wherein $\chi$ is an inverse of cross polar discrimination (XPD).

15. The method according to claim 14, further comprising:
  decoding, by the mobile station, the second data stream according to the spatial correlation of the first group.

16. The method according to claim 15, further comprising:
  receiving, by the mobile station, the first CSI-RS from the base station; and
  obtaining, by the mobile station, a long-term channel estimation based on the first CSI-RS.

17. The method according to claim 16, further comprising:
  receiving, by the mobile station from the base station, a second CSI-RS informing of a communicating mode determined by the base station, wherein when the communicating mode is a first communicating mode, the first data stream is precoded according to the spatial correlation of the first group, and when the communicating mode is a second communicating mode, the second data stream is precoded according to the first polarization of the first subgroup;
  obtaining, by the mobile station, a group-polarization specific CSI based on the second CSI-RS; and
  sending, by the mobile station to the base station, the group-polarization specific CSI enabling the base station to obtain a user specific precoding matrix based on the group-polarization specific CSI.

18. The method according to claim 17, further comprising:
  using, by the mobile station, according to the communication mode informed by the second CSI-RS, a first codebook corresponding to the first polarization of the first subgroup or a second codebook corresponding to the spatial correlation of the first group, wherein the first codebook comprises an element indicating a second polarization having a value of 0, and wherein the second polarization is different from the first polarization of the first subgroup.

* * * * *